United States Patent
Setzler et al.

(10) Patent No.: US 6,714,578 B2
(45) Date of Patent: Mar. 30, 2004

(54) CALCIUM GALLIUM SULPHIDE ($CAGA_2S_4$) AS A HIGH GAIN ERBIUM HOST

(76) Inventors: Scott D. Setzler, 32 Forest St., Manchester, NH (US) 03102; Peter G. Schunemann, 111 Wheeler Rd., Hollis, NH (US) 03061; Thomas M. Pollak, 8 N. Meadow Rd., Amherst, NH (US) 03031

( * ) Notice: Subject to any disclaimer, the term of this patent is extended or adjusted under 35 U.S.C. 154(b) by 0 days.

(21) Appl. No.: 10/165,779

(22) Filed: Jun. 6, 2002

(65) Prior Publication Data

US 2002/0186734 A1 Dec. 12, 2002

Related U.S. Application Data

(60) Provisional application No. 60/296,411, filed on Jun. 6, 2001.

(51) Int. Cl.[7] .................... H01S 3/09; H01S 3/092; H01S 3/093
(52) U.S. Cl. .................... 372/69; 372/70; 372/72
(58) Field of Search .................... 372/69–73, 41, 372/91, 99

(56) References Cited

U.S. PATENT DOCUMENTS

| | | | |
|---|---|---|---|
| 4,942,119 A | | 7/1990 | Ozin et al. |
| 5,038,358 A | * | 8/1991 | Rand ..................... 372/69 |
| 5,117,437 A | * | 5/1992 | Rand ..................... 372/70 |
| 5,166,948 A | * | 11/1992 | Gavrilovic et al. ........ 372/70 |
| 5,181,211 A | | 1/1993 | Burnham et al. |
| 5,200,966 A | * | 4/1993 | Esterowitz et al. ........ 372/71 |
| 5,535,232 A | * | 7/1996 | Bowman et al. ........... 372/70 |
| 5,557,624 A | | 9/1996 | Stultz et al. |
| 5,682,397 A | * | 10/1997 | Scheps .................... 372/22 |
| 6,047,013 A | * | 4/2000 | Payne et al. .............. 372/41 |
| 6,246,711 B1 | | 6/2001 | Stultz et al. |
| 6,404,785 B1 | | 6/2002 | Scheps |
| 6,529,675 B1 | | 3/2003 | Hayden et al. |

* cited by examiner

*Primary Examiner*—Paul Ip
*Assistant Examiner*—Phillip Nguyen
(74) *Attorney, Agent, or Firm*—Devine, Millimet & Branch; Paul C. Remus

(57) ABSTRACT

The present invention uses a novel crystal host to minimize parasitic upconversion and lifetime quenching processes by increasing the distance between active dopant ions in the matrix. As a result, erbium that could previously only be useful at low levels may now be incorporated at much higher concentrations without adverse effects. In addition, this host has long excited-state-lifetimes, making it more effective as an energy storage device for pulsed laser applications.

12 Claims, 3 Drawing Sheets

CALCIUM GALLIUM SULPHIDE ($CAGA_2S_4$) AS A HIGH GAIN ERBIUM HOST

The present application claims priority from Provisional Application Serial No. 60/296,411, which was filed Jun. 6, 2001 and is fully incorporated herein by reference.

FIELD OF THE INVENTION

The present invention is in the field of ion-doped crystals as used for optic transmission.

BACKGROUND OF THE INVENTION

There currently exists a need in the optic transmission industry for an efficient amplifier in the 1.53 to 1.65 micron spectral region. The need is based on an expectation that future optic systems will utilize the full fiber transmission region from approximately 1.3 to 1.6 microns.

Current glass fiber photonic amplifiers rely on the implantation of active ions, which, possessing the proper energy level excited state structures provide optical gain, in desired wavelength regions. Current glass hosts, by their intrinsic disordered nature, exhibit low-gain cross-sections with penalties paid in optical gain and narrow optical gain bandwidth, typically from 1.53 to 1.58 microns. These low gain cross-sections predicate long lengths of glass fiber to provide amplification levels.

Quasi-three level lasers (or amplifiers) based on the ground state transitions of numerous rare-earth ions are limited by several factors. Specifically, the excited state lifetimes are too short for useful applications and the typical host matrices allow parasitic upconversion mechanisms. Once ions within a crystal are excited, they will remain excited only for a short number of milliseconds, defined as the excited state lifetime. While excited, the ion-doped crystal contains the potential energy to amplify an optic signal of similar spectral energy or resonantly pump laser light. Once the excited state lifetime expires, the ions will need to be re-excited to regenerate the potential energy. Therefore, the longer the excited state lifetimes, the less often the ions need to be re-excited and the more efficient the system.

Excited state lifetimes are largely determined by host matrix, namely by the phonon energies of the lattice. For typical oxide glasses and crystals, the lifetime is relatively short (i.e., less than 7 milliseconds). Fluoride hosts, such as yttrium lithium fluoride ("YLF"), have lower phonon energies and longer lifetimes (5–10 milliseconds). Increasing the first-excited-state lifetime could make efficient pulsed laser systems, such as eyesafe imaging and range finding lasers.

Parasitic upconversion processes are, to a large degree, dependent upon the host matrix. Parasitic upconversion processes deplete the excited-state population without the release of a useful photon. It is typically a concentration-dependent process since it is linked to the distances between, and relative orientation of, neighboring excited ions. Keeping the dopant levels low increases the average distance between excited ions and minimizes upconversion to some extent. However, low dopant levels are not always practical from a device perspective, and an alternate means of minimizing upconversion would be extremely beneficial. Minimization of upconversion could make optical amplifiers more efficient and smaller.

Erbium doped fiber amplifiers (EDFAs) are currently used to periodically amplify optical communications information as it passes across long fiber optic networks. These amplifiers are long (i.e., several meters) small diameter fibers doped with low concentrations of erbium (i.e., 0.2% or less). The low concentrations make erbium-erbium interactions unlikely since no two ions are likely to be near each other, whereas the long length is required to achieve significant optical gain. If the erbium concentration were increased by a factor of x, the required length would, to first order, be correspondingly reduced by a factor of x. For example a 5 meter Erbium doped fiber with a 0.2% concentration will provide gain identical to a 0.5 meter Erbium doped fiber with a 2.0% concentration. In practice, however, the latter fiber cannot be used since the dopant ions become too closely spaced in the fiber host, heavily increasing the parasitic upconversion process.

SUMMARY OF THE INVENTION

The present invention is based on the realization that calcium gallium sulfide can be used as a high gain erbium host to minimalize upconversion and increase the excited state lifetime over existing hosts.

The present invention uses a novel crystal host to minimize parasitic upconversion and lifetime quenching processes by increasing the distance between active dopant ions in the host matrix. As a result, ions such as erbium that could previously only be useful at low concentrations may now be incorporated at much higher concentrations without adverse effects. In addition, this host has long excited-state lifetimes, making it more effective if used as an energy storage device for pulsed laser applications or other applications.

BRIEF DESCRIPTION OF THE DRAWINGS

These and other features and advantages of the present invention will be better understood by reading the following detailed description, taken together with the drawings wherein:

FIG. 1 shows upconversion in erbium-doped crystals.

DETAILED DESCRIPTION OF THE INVENTION

Figure 1A:
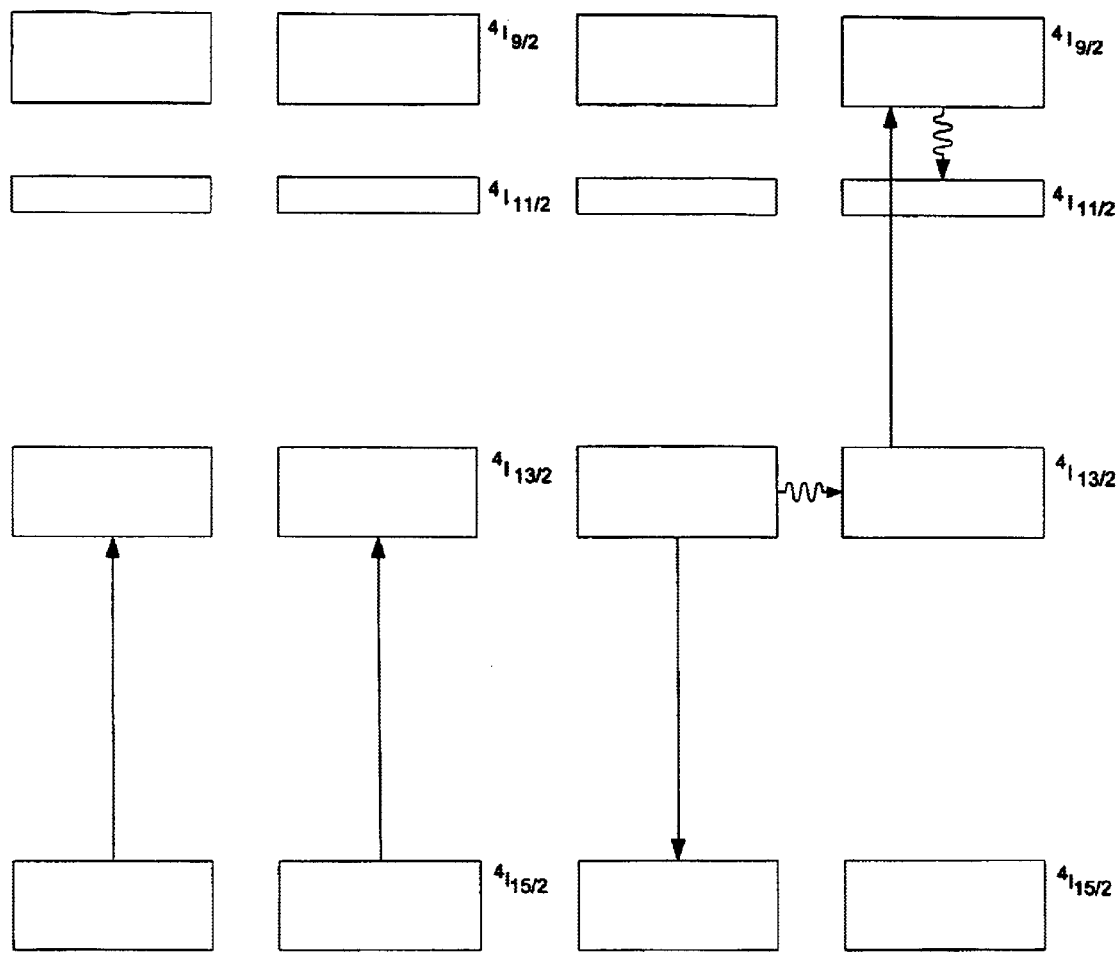
FIG. 1a shows two nearby erbium ions excited by a pump light.
Figure 1A:
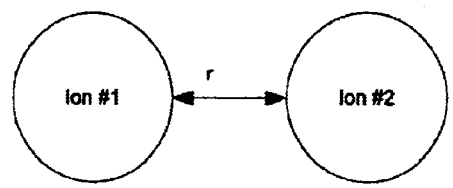
Figure 1B:
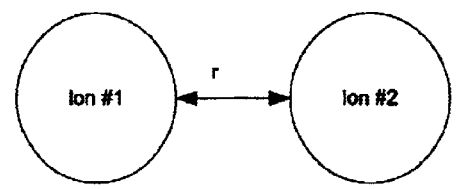
FIG. 1b shows the ions exchanging energy without producing a photon.

FIG. 1 depicts the parasitic upconversion process in erbium. The energy levels of two ions are depicted. Both ions are in the excited state and are separated by distance r. Ideally, the energy from each ion would be extracted optically as a photon, amplifying a signal or contributing to a pulsed laser emission. In many cases, however, electric dipole and multipole interactions between the ions will result in a transfer of energy between the ions. Ion#1 returns to the ground state without emitting a photon, and the released energy is used to excite ion#2 to a higher-lying state. One factor in the upconversion process is that the energy required to reach the latter state is nearly equal to the energy released. Therefore, the ion released energy will be used for the application of the device (i.e. amplify a signal), unless a sufficiently proximate ion steals the released energy for upconversion.

Conventional crystalline hosts can alleviate this problem to some extent, allowing dopant concentrations as high as 1 or 2%, but upconversion again becomes a problem at higher concentrations. As reported by Ibanez et al., [J. Solid State Chem. 53, 406–414 (1984)], the lattice structure of $CaGa_2S_4$ forces dopant ions further apart, allowing higher dopant concentrations. The authors doped 50% of the Ca-sites with neodymium (Nd), the rest of the Ca-sites were doped with sodium (Na) for charge compensation. The lifetime of Nd ions was barely reduced (a common sequence of Nd concentrations higher than a few percent); indicating that the ions were not interacting as they normally would at such high concentrations in a conventional host. It is worth noting, that the authors are reporting that the lifetime is not reduced at high concentrations, and this is directly attributable to increased separation of dopant ions. In a similar fashion, the upconversion interaction in erbium is reduced by the increased separation in $CaGa_2S_4$.

Figure 2:
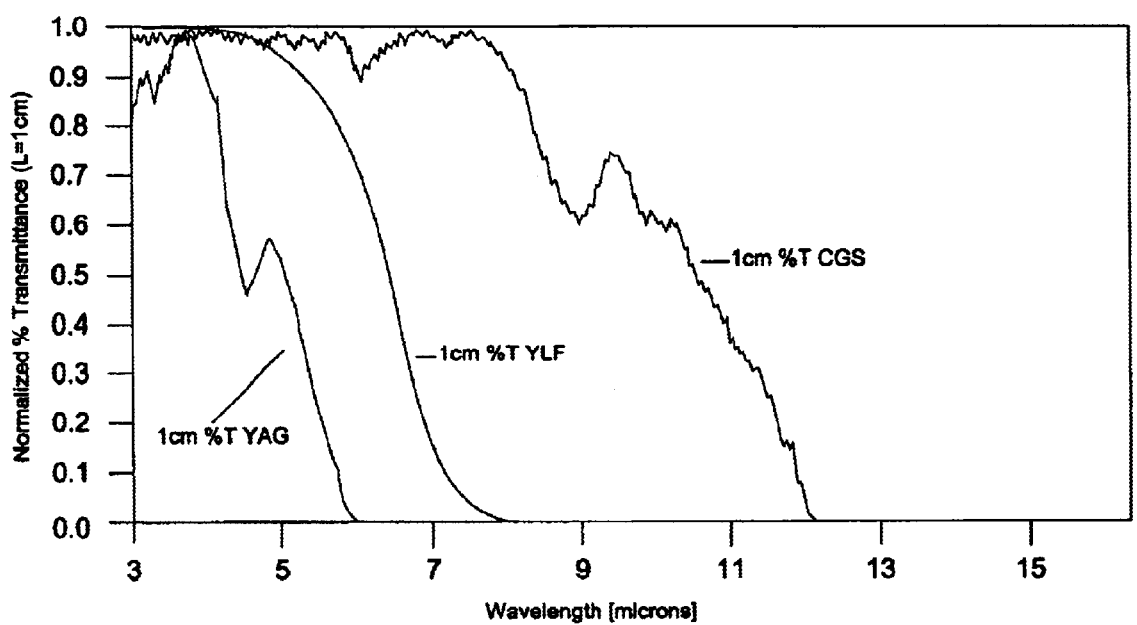
FIG. 2 shows the infrared transmission spectra of YAG, YLF, and $CaGa_2S_4$ for one centimeter pathlengths.

As mentioned earlier, reduced phonon energies in a host such as $CaGa_2S_4$ results in an increase in the fluorescence lifetimes of the excited states of rare-earth ions. This is not to be confused with the reduction of lifetime quenching at high Nd concentrations in the report given above. Even at low concentrations, the fluorescence lifetimes of the rare-earth ions will be longer than in oxide or fluoride hosts. FIG. 2 shows a transmission spectrum of erbium-doped $CaGa_2S_4$, indicating an infrared cut-off around 8.6 microns. Also depicted are the transmission spectra of erbium-doped yttrium aluminum garnet (Er:YAG) and erbium-doped yttrium lithium fluoride (Er:YLF) (YAG and YLF are oxide and fluoride hosts). The infrared cut-off of these hosts (defined here as the wavelength where transmission drops to 80%) is 4.3 and 5.9 microns respectively, and is a measure of the lattice phonon energy. The fluorescence lifetimes of the first excited states in Er:YLF and Er:YAG are about 10 and 7 milliseconds, respectively. Similarly, the second-excited-state lifetimes are about 4 and 0.1 milliseconds, respectively. The longwave cut-off of $CaGa_2S_4$ implies the phonon energies are low; hence the fluorescence lifetimes are long.

This feature is of particular importance to energy storage lasers. For example, the first-excited-state of an Er:YLF crystal can be generated by pumping a continuous wave (cw) or long-pulse laser (ions in an ion-doped crystal are normally excited by some type of pump laser). If release of the excited state energy is not allowed, the ions will stay in an excited state for about one lifetime, or 10 msec. So 10W of pump power will result in about 100 mJ of stored energy (10W×10 msec=100 mJ). If the crystal is suddenly allowed to lase (release its energy), as in a Q-switched resonator, this energy will be released in a very short pulse with a duration on the order of nanoseconds. In one application, using this crystal in a Q-switched resonator will have create an "eye-safe" laser. An eyesafe laser pulse is useful for determining the range of a target (by measuring the time required for the reflected pulse to return), for illuminating a target (by casting a flash of light across the entire target for viewing with night-vision techniques), or for 3D-Lidar measurements (a combination of the two). If the storage lifetime is significantly longer, 20 msec. for example, a 200 mJ pulse could be generated using the same 10W pump source. The increased pulsed energy significantly increases the useful span of range-finding and target-ID technologies.

The present invention utilizes a novel crystal (calcium gallium sulphide, or $CaGa_2S_4$) as a host for rare-earth ions. Specifically, erbium-doped $CaGa_2S_4$ ($Er:CaGa_2S_4$) suffers minimal parasitic upconversion. The minimized upconversion allows higher Erbium concentrations and, in turn, shorter gain lengths. In principal, a 1-cm long $Er:CaGa_2S_4$ crystal can exhibit optical gains as high or higher than a several-meter long erbium doped fiber typically used in an EDFA. The new crystal can reduce the cost, size and complexity of current optical amplifier systems.

While calcium gallium sulphide ($CaGa_2S_4$) belongs to a class of materials capable of hosting ions for laser emission of varying spectral regions, it also has several unique properties making it a suitable host for erbium ions emitting ~1.6 um. The first excited state ($^4I_{13/2}$) to ground state ($^4I_{15/2}$) transition in trivalent erbium ($Er^{3+}$) results in emissions of approximately 1.6 um (~1.50–1.70 um), and is uniquely host dependent. Population of the first excited state is often achieved by resonant pumping (placing the crystal is a resonator and pumping it within the resonator with a pump light), or simply exciting ions from the ground state to the $^4I_{13/2}$ level with a pump light (typically required to operate ~1.4–1.5 um). Trivalent erbium is normally highly susceptible to parasitic upconversion, wherein a special host is required to impede the upconversion process.

The upconversion process is host dependent, as the ion spacing, or separation, plays a major role in the ability of excited ions to interact. The lattice parameters of calcium gallium sulphide, however, are such that here is little crosstalk between neighboring excited ions, hence upconversion is minimized. In addition, the low phonon energy of the host results in long excited-state lifetimes, hence the ability to store energy in the $^4I_{13/2}$ level, while utilizing a Q-switched resonator in one embodiment, is significantly greater than typical oxide and fluoride hosts.

Figure 3:
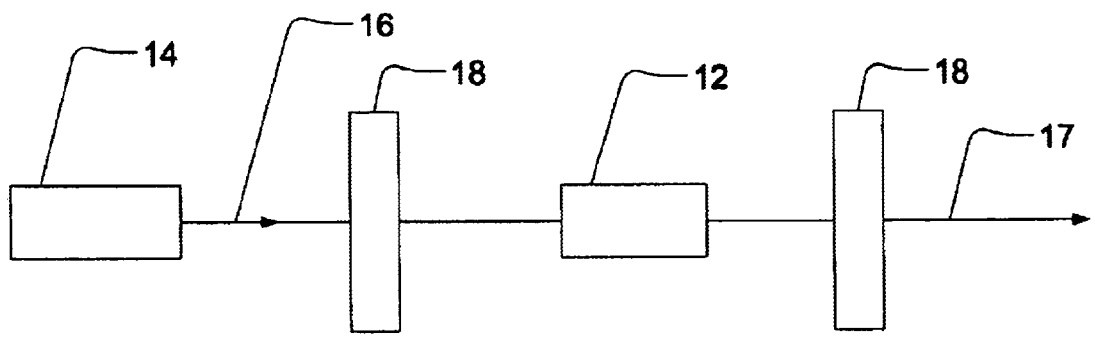
FIG. 3 is a schematic block diagram of a laser system according to one embodiment of the present invention.

FIG. 3 shows one embodiment of the present invention. The invention is a laser system 10 having a crystal 12 of calcium gallium sulphide doped with Erbium and a pump source 14 positioned to energize the crystal with pump light 16 wherein the crystal will emit energy 17 in the spectral region of 1.50 to 1.70 microns. The crystal may also be resonantly pumped through the use of a resonator, which is principally two mirrors 18 which reflect an optic signal back and forth between the mirrors until released. One type of resonator is a Q-switched laser, which, in this invention, can be used to store energy up to 10 milliseconds. The crystal can be doped with Erbium in concentrations over 1%, making the crystal useful for EDCAs. The crystal can further be doped efficiently with Erbium in concentrations over 4%, which was heretofore unavailable in laser systems.

In addition, applications requiring high energy, eyesafe pulses can benefit from this technology. Military based laser rangefinders and target identification systems can be made smaller, lighter, more efficient, and with longer range-resolving capability. Other applications that require higher power levels, such as free space communication links, could use this crystal host for broader operational wavelength capabilities with improved range and adverse weather performance. Longer wavelengths experience reduced attenuation and scatter through poor atmospheric conditions.

Modifications and substitutions by one of ordinary skill in the art are considered to be within the scope of the present invention, which is not to be limited except by the following claims.

We claim:

1. A laser system comprising:
   a crystal of calcium gallium sulphide doped with Erbium; and
   a pump source positioned to energize the crystal wherein the crystal will emit energy in the spectral region of 1.50 to 1.70 microns.

2. The system of claim 1 further comprising a laser resonator whereby the Erbium, in an excited state, is resonantly pumped.

3. The system of claim 1 further comprising a Q-switched resonator whereby the excited state of Erbium is capable of storing energy for approximately 10 microseconds.

4. The system of claim 1 wherein the crystal is doped with a concentration of at least about one percent Erbium.

5. The system of claim 4 wherein the crystal is doped with a concentration of at least about four percent Erbium.

6. The system of claim 1 wherein the crystal will emit energy in the spectral region of about 1.6 microns.

7. A method of generating an optical energy comprising:
   energizing a crystal of calcium gallium sulphide doped with Erbium wherein the crystal will emit energy in the spectral region of 1.50 to 1.70 microns.

8. The method of claim 7 further comprising resonantly pumping the Erbium, in an excited state.

9. The method of claim 7 further comprising storing energy in the energized crystal for approximately 10 microseconds with a Q-switched resonator.

10. The method of claim 7 wherein the crystal is doped with a concentration of at least about one percent Erbium.

11. The method of claim 10 wherein the crystal is doped with a concentration of at least about four percent Erbium.

12. The method of claim 7 wherein the crystal will emit energy in the spectral region of 1.6 microns.

* * * * *

UNITED STATES PATENT AND TRADEMARK OFFICE
CERTIFICATE OF CORRECTION

PATENT NO. : 6,714,578 B2
DATED : March 30, 2004
INVENTOR(S) : Scott D. Setzler et al.

It is certified that error appears in the above-identified patent and that said Letters Patent is hereby corrected as shown below:

Title page,
Item [73], Assignee, should read -- BAE Systems Information and Electronics Systems Integration Inc. --.

Signed and Sealed this

Eighteenth Day of October, 2005

JON W. DUDAS
*Director of the United States Patent and Trademark Office*